United States Patent [19]

Elderton

[11] Patent Number: 4,671,061
[45] Date of Patent: Jun. 9, 1987

[54] SCOOP-CONTROLLED FLUID COUPLINGS

[75] Inventor: John Elderton, Hampton Hill, England

[73] Assignee: Fluidrive Engineering Company Limited, Bracknell, England

[21] Appl. No.: 726,955

[22] Filed: Apr. 26, 1985

Related U.S. Application Data

[63] Continuation of Ser. No. 505,608, Jun. 20, 1983, abandoned.

[30] Foreign Application Priority Data

Jun. 22, 1982 [GB] United Kingdom ............... 8218002

[51] Int. Cl.<sup>4</sup> .............................................. F16D 33/14
[52] U.S. Cl. ........................................ 60/351; 60/337;
60/347; 60/367; 416/180
[58] Field of Search ................ 60/337, 338, 347, 351,
60/367, 364; 416/180, 181, 203; 29/156.8 FC;
188/296

[56] References Cited

U.S. PATENT DOCUMENTS 2,407,496  9/1946  Jandasek .................... 60/337
3,037,459  6/1962  Nelden ...................... 60/367

FOREIGN PATENT DOCUMENTS

| 687919 | 2/1940 | Fed. Rep. of Germany | 60/364 |
| 906872 | 2/1954 | Fed. Rep. of Germany | 416/180 |
| 1031641 | 6/1958 | Fed. Rep. of Germany | 60/364 |
| 179486 | 5/1962 | Fed. Rep. of Germany | 60/347 |
| 669331 | 4/1952 | United Kingdom . | |
| 1346677 | 2/1974 | United Kingdom . | |
| 1484011 | 8/1977 | United Kingdom . | |
| 2018958 | 10/1979 | United Kingdom . | |

Primary Examiner—A. Michael Chambers
Attorney, Agent, or Firm—Flynn, Thiel, Boutell & Tanis

[57] ABSTRACT

A scoop controlled fluid coupling has a toroidal working circuit W defined by vaned impeller and runner elements 11,12. Working liquid is supplied to the working circuit W from a rotating reservoir 9 by an adjustable scoop tube 15 having a scooping orifice 16, the radial position of which is to determine the degree of filling of the circuit W. To counteract unintentional changes in the filling due to thermal expansion of the liquid, the runner diameter is about 10% smaller than that of the impeller, and the runner has two sets of holes 54,55 which permit liquid to escape from the circuit.

16 Claims, 9 Drawing Figures

SCOOP-CONTROLLED FLUID COUPLINGS

This application is a continuation, of U.S. Ser. No. 505,608, filed June 20, 1983 now abandoned.

FIELD OF THE INVENTION

The present invention relates to scoop-controlled fluid couplings.

BACKGROUND OF THE INVENTION

A scoop-controlled fluid coupling comprises coaxially mounted impeller and runner elements, each in the form of a dished and vaned shell together defining a working circuit for working liquid, a reservoir casing rotatable with the impeller for holding working liquid radially outside the working circuit, a movable scoop having a scooping tip adjustable to different radial positions in the reservoir casing for collecting liquid from the rotating ring of liquid held therein and for returning it, optionally via a cooler, to the working circuit, from which the working liquid can return to the reservoir through one or more restricted outlets.

Such scoop-controlled couplings are often incorporated in drives for high inertia loads such as long conveyor belts for coal and other minerals. Such conveyor belts may be several kilometers in length but of relatively light belt construction. It is therefore essential that no excessive driving loads should be exerted on the belt, especially during start-up, which may take several minutes. Although a long conveyor belt can have two or more driving heads distributed along its length, and each drive may have two driving motors, each driving into a separate fluid coupling, there may be a requirement, under emergency conditions, for example failure of one or more motors or their supplies, for a reduced number of motors to be able to accelerate the load from rest to working speed without overstressing the belt or heating the fluid coupling beyond permissible limits.

In fact, it is now often a requirement for a coupling in such applications that the torque transmitted by the coupling throughout the start-up operation should not exceed 115% to 125% of the normal driving torque for that particular condition of conveyor loading.

Thus, when starting an empty or very lightly loaded conveyor, the load to be applied is small compared with the full motor load.

Where the drive or each drive comprises a squirrel cage motor and scoop-controlled coupling, the low starting torque is achieved by appropriately lengthening the starting operation. Thus the scoop-operating lever of the coupling is moved gradually over its full path of travel, in say three or more minutes during which time the coupling is operating with a decreasing but obviously large degree of slip with corresponding heat generation.

It has been found that the resulting expansion of the working liquid (particularly with synthetic liquids specified for coal mines) results probably in a greater mass of liquid being present in the working circuit than should be as determined by the position of the scoop, with the result in any event that the transmitted torque becomes greater than intended with risk of damage to the driven load or of overloading the motor or other prime mover.

SUMMARY OF THE INVENTION

A scoop-controlled coupling according to the present invention is characterised in that the outer profile diameter of the runner is from 5 to 15%, preferably 10 to 15%, less than the outer profile diameter of the impeller, and in that one of the vaned elements, preferably the runner, has two sets of holes drilled through its shell the centres of one set of holes being spaced from the coupling axis by from 53 to 63%, preferably 58%, of the outer profile radius, and the centres of the second set of holes being spaced from the coupling axis by 65 to 75%, preferably 70%, of the outer profile radius.

It is believed that, with the arrangement according to the invention, a greater degree of stability is obtained throughout the partially filled states of the working circuit during the acceleration of the load as the result of the smaller volume of the effective working circuit while at the same time, the heat capacity of the impeller structures and reservoir is large enough to moderate the increase in temperature during acceleration.

It is highly advantageous for the runner to be of the kind disclosed in British Patent Specification No. 669331, that is to say in which the shapes of some of the intervane pockets of the runner element, as disclosed by section planes containing the axis of rotation of the coupling, differ from the shapes of other pockets of the same runner element, the runner element being preferably provided with core guide means wherein the shapes of some the inter-vane passages between the core guide means and the dished shell of the runner element, as disclosed by the section planes, differ from the shapes of the other inter-vane passages.

BRIEF DESCRIPTION OF THE DRAWINGS

An embodiment of the invention will now be described by way of example with reference to the accompanying drawings, in which.

DETAILED DESCRIPTION

Figure 1:
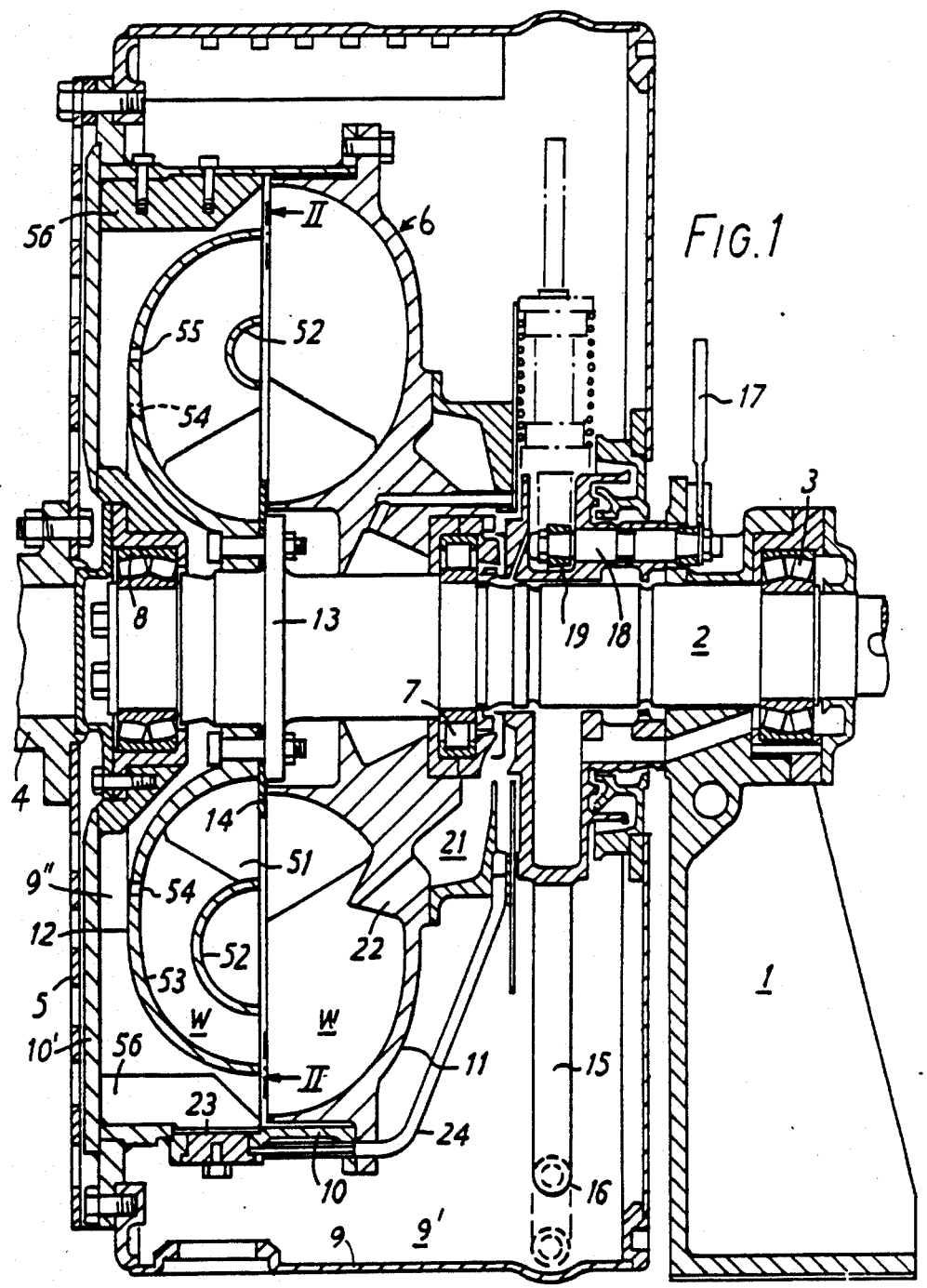
FIG. 1 is an axial sectional view of a scoop-controlled coupling in accordance with the invention.
Figure 2:
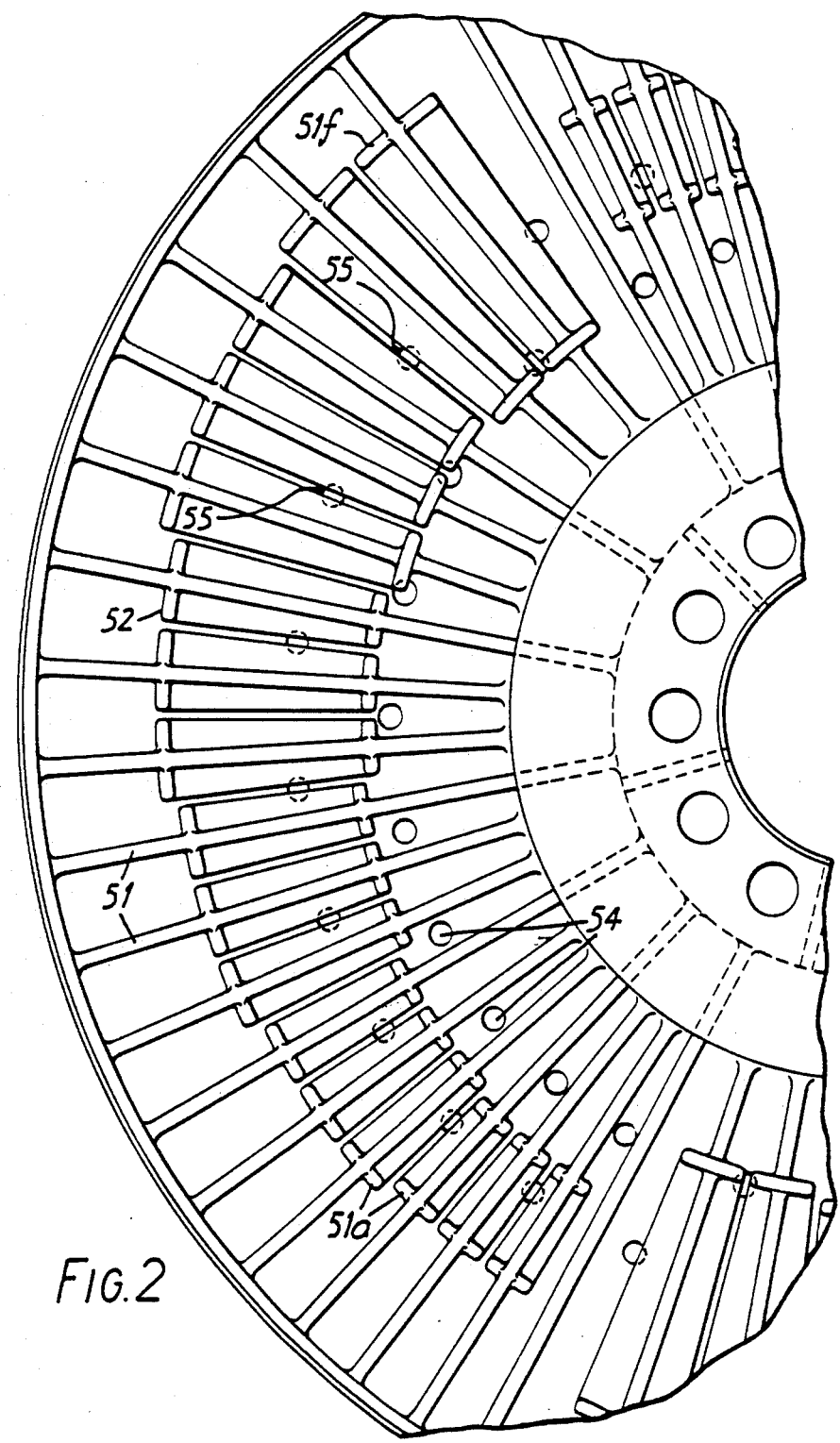
FIG. 2 shows one-third of a radial section on the line II—II of FIG. 1, on an enlarged scale.
Figure 3A:
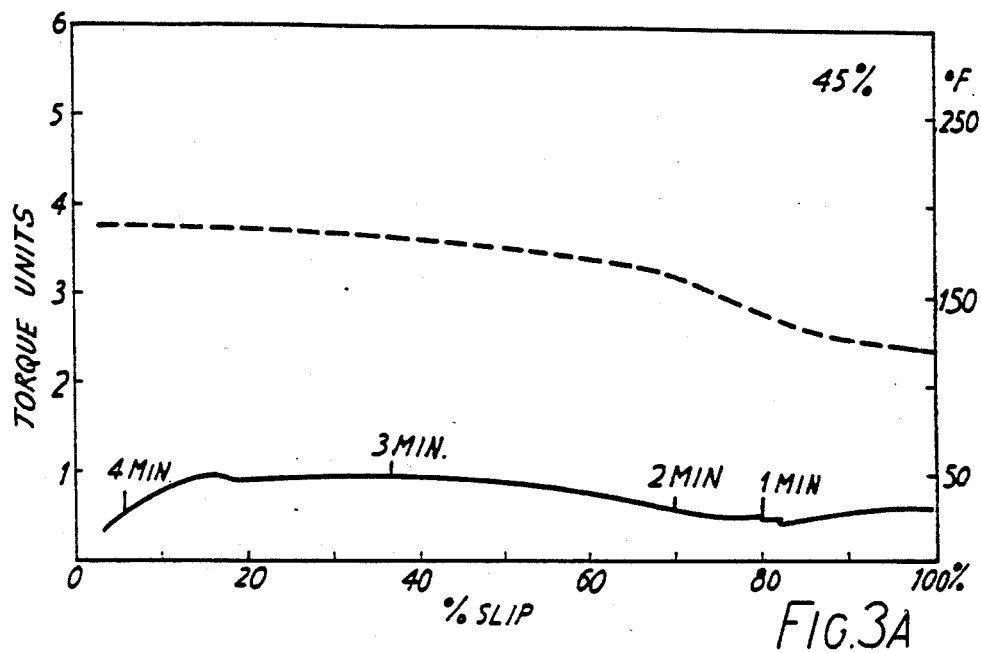
FIGS. 3A to 3E are graphs showing in full lines the torque of the coupling plotted against slip for various positions of the scoop and in broken lines the corresponding temperature, as obtained when a conventional scoop-controlled coupling using non-toxic phosphate ester is used to drive a high-inertia load.
Figure 3B:
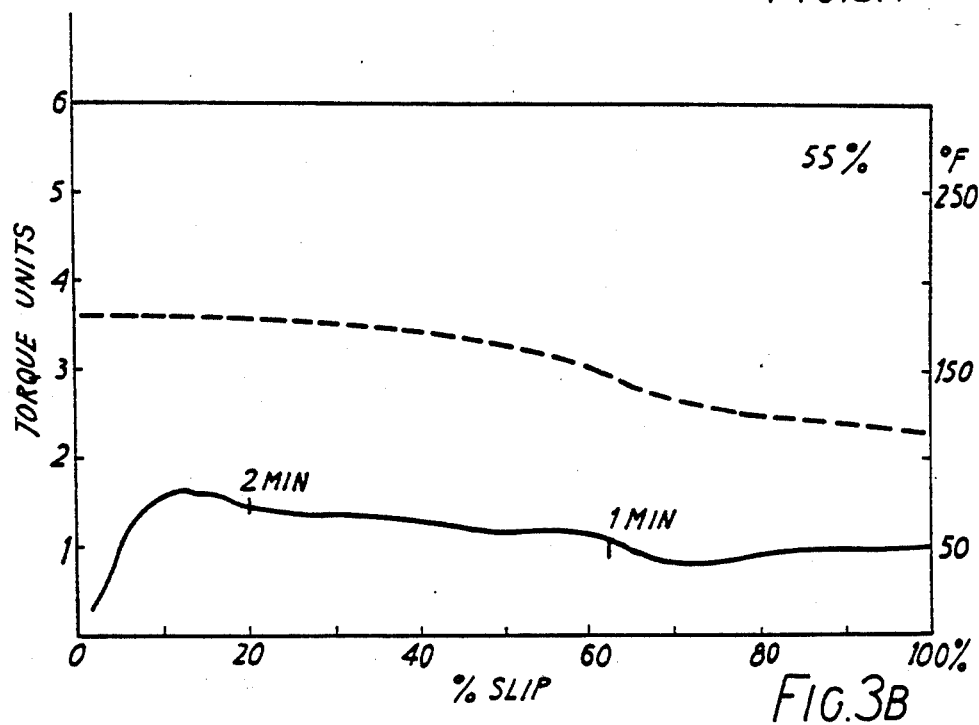
Figure 3C:
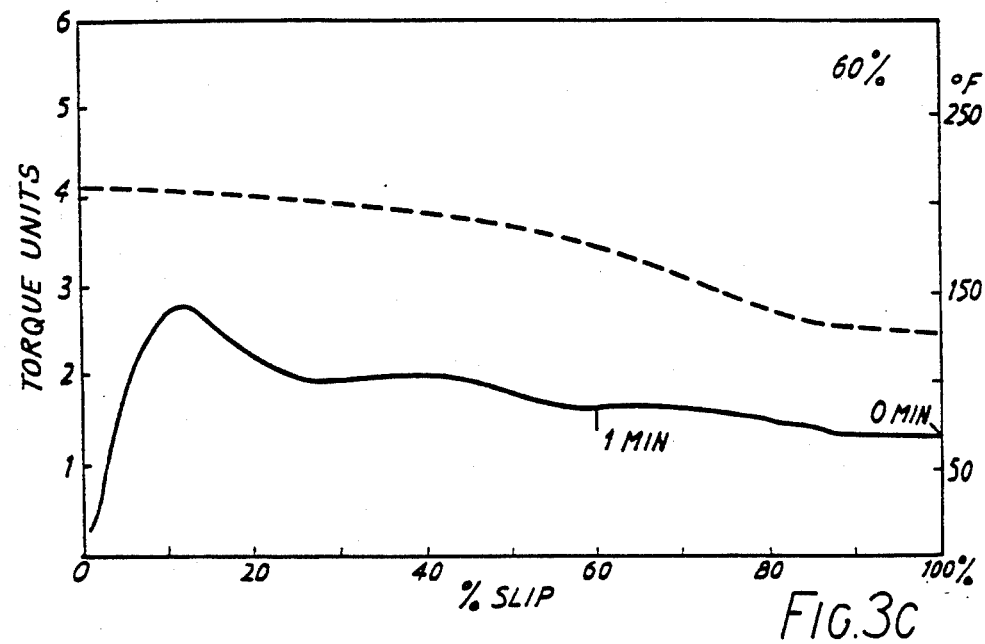
Figure 3D:
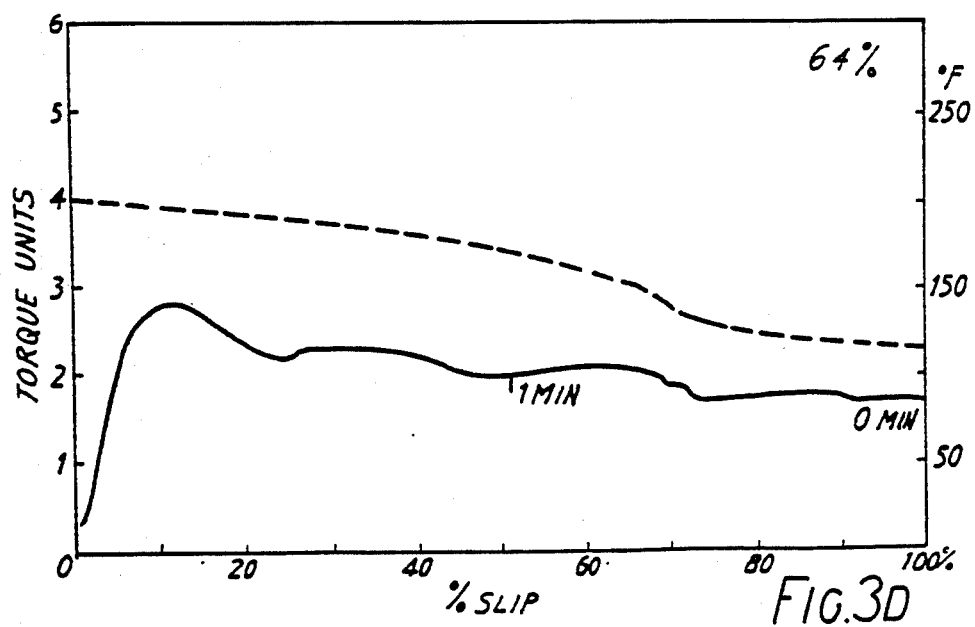
Figure 3E:
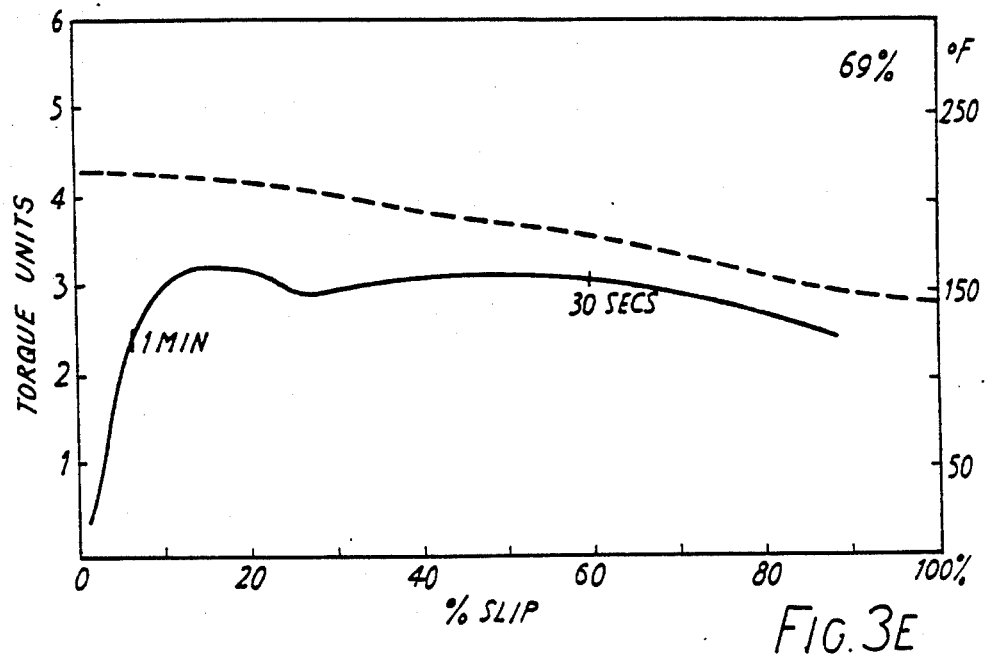

The scoop-controlled coupling shown in FIGS. 1 and 2 follows conventional practice in so far as it comprises a stationary cast iron bracket 1 which an output shaft 2 is partially supported by a self-aligning bearing 3. An input sleeve 4 is connected by a flexible driving plate 5 to an impeller assembly 6 which is supported on the output shaft 2 by bearings 7 and 8.

The impeller assembly 6 comprises an outer sleevelike reservoir casing 9 and an inner sleevelike impeller casing 10 to which is secured a dished impeller 11 of conventional design. A reservoir 9' is defined between these casings. A runner 12, to be described in more detail below, defines, with the impeller 11, a working circuit W. The runner 12 is bolted to a flange 13 on the output shaft 2 with the inter position of an annular baffle 14. The bearing 7 supports the hub of the impeller 11 on the output shaft 2. The impeller assembly also includes an end plate 10' secured to the casing 10, which plate is supported by the bearing 8 and radially overlaps the exterior side of the runner 12 so as to define a space 9" therebetween, which space 9" communicates with the radially outer part of the impeller 11.

A radially slidable scoop tube 15 has a scooping orifice 16 movable over a range of positions within the reservoir formed by the casing 9. In a known manner, a scoop control lever 17 is mounted on a shaft 18 which is supported in the bracket 1 and carries a swing arm 19 formed with a slot which receives a pin on the scoop tube 15. The scoop tube has an outlet (not shown) which connects with an external cooler from which working liquid is returned to an annular collecting ring 21 in the impeller hub, from which the liquid returns to the working circuit W through shielded inlet ports 22. Working liquid leaves the working circuit W at a restricted rate through conventional leak-off nozzles 23 into the reservoir 9. The nozzles 23 may be replaced by known quick-emptying valves controlled by tubes 24, if required.

Figure 5:
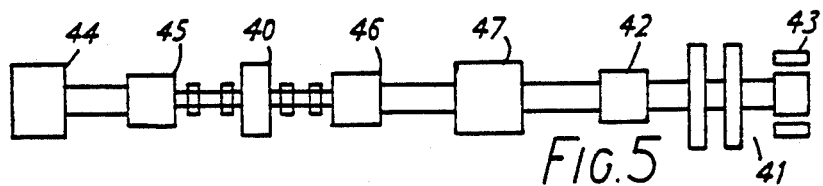
FIG. 5 shows diagramatically a test rig stimulating a conveyor.

In a conventional coupling, the runner 12 would have the same internal and external profile diameters as the impeller 11. The runner would have vanes similar to the impeller (but different in number and arrangement), but without any core guide means. The curves shown in FIG. 3 are obtained with a conventional coupling when installed in the test rig shown in FIG. 5 in which the inertia of a conveyor is represented by a flywheel assembly 41 and step-up gear box 42 while its running resistance is represented by a brake 47. A friction brake 43 enables the load system to be held stationary at the commencement of each test cycle and then be released at the appropriate time to simulate breakaway. The coupling 40 has its input sleeve 4 connected to the output of a gear box 45 driven by a motor 44, and has its output shaft 2 drivingly connected to the input of the gear box 42. The output torque of the coupling 40 is measured by a transducer 46, enabling the transmitted power to be determined.

Referring now to FIG. 3, it will be seen that in each test, the coupling starts with the working circuit empty at the right hand end of the figure, corresponding to 100% slip. The curves shown in FIG. 3A were obtained with the scoop positioned 45% of the distance from its "working circuit empty" position to the "working circuit full" position. FIGS. 3B, C, D, E correspond to the 55%, 60%, 64% and 69% travel positions. Normally, in any particular setting of the scoop lever, the curves should be substantially level or slope downwards to the left. In fact, it is found that as a result of the prolonged acceleration times and the corresponding temperature rise, the curves tend to rise towards the left instead of falling, resulting in an unacceptable 'hardening' of the coupling i.e. increased transmitted torque with an increased driving force on the load.

In accordance with the invention, the runner 12 in FIGS. 1 and 2 is generally of the kind shown in FIG. 1 of British specification No. 669331. In particular, its vanes 51 carry short sections 52 of a core guide which vary in dimensions around the axis of the runner, increasing in size from the smallest 51a to the largest 51f. Further, the wall 53 of the runner has inner and outer sets of holes 54 and 55 drilled through it on pitch circle diameters which are respectively 58% and 70% of the outer profile diameter of the runner (in this case 36 inches or 914 mm), which holes communicate with the space 9". Each hole 54,55 is about 11 mm in diameter and thus about 0.012 times the outer profile diameter of the runner. Typically, the runner may have 45 or 54 vanes. The holes 54 are drilled through alternate vane pockets and the holes 55 in the other vane pockets (not containing a hole 54).

Further, the outer profile diameter of the runner 12 is about 10% less than that of the impeller 11. This is conveniently achieved by selecting a runner designed for a smaller size of coupling where there is a standard range available.

The pattern shown in FIG. 2 is repeated in each of the other two thirds of the runner.

A segmental filler ring 56 is bolted to the inner casing of the impeller assembly, gaps in this ring communicating with the nozzles 23.

Further, the baffle 14 is of reduced external diameter, typically 1.3× the inner profile diameter of the working circuit.

Figure 4:
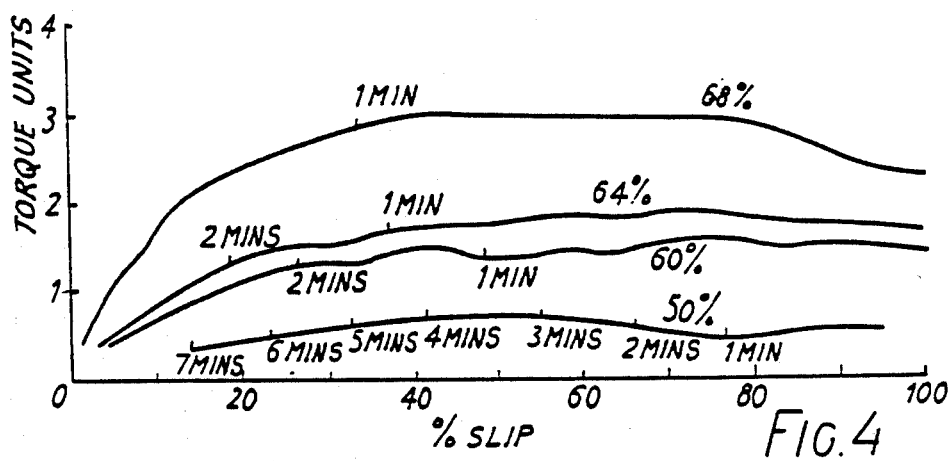
FIG. 4 shows corresponding torque curves obtained with the coupling shown in FIGS. 1 and 2.

With the coupling shown in FIGS. 1 and 2, curves such as those shown in FIG. 4 are obtained in which localised overloading of the conveyor belt is avoided.

Preferably, the diameter of the holes 54,55 is in the range 1 to 1.6% of the outer profile diameter of the runner.

What is claimed is:

1. In a scoop-controlled fluid coupling which includes: an impeller and a runner which are supported coaxially with respect to and for independent rotation about a coupling axis, said impeller and runner each being a dished shell having plural angularly spaced vanes and together defining a working circuit for a working liquid; an impeller casing supported on said impeller for rotation therewith; a reservoir casing rotatable with said impeller for holding a quantity of the working liquid radially outside said working circuit; and means which includes a radially movable scoop having a scooping tip adjustable to different radial positions in said reservoir casing for collecting liquid from a rotating ring of the liquid held in said reservoir casing and for supplying it to said working circuit, from which the working liquid can return to said reservoir casing through a restricted outlet; the improvement comprising the outer profile diameter of said runner being from 5 to 15% smaller than the outer profile diameter of said impeller and the radially outermost part of said impeller lying radially beyond said runner, said impeller casing extending around said runner and projecting inwardly so as to radially overlap the exterior side of the runner to define a fluid-flow space therebetween, said fluid-flow space communicating with the radially outermost part of the impeller, said runner having first and second sets of holes provided through said shell thereof for direct communication with said fluid-flow space, the centres of said holes of said first set being spaced from said coupling axis by a distance in the range of 53 to 63% of the outer profile radius of said runner, and the centres of said holes of said second set being spaced from said coupling axis by a distance in the range of 65 to 75% of the outer profile radius of said runner, said holes in said runner communicating with said radially outermost part of said impeller through said fluid-flow space so that working fluid can flow from the working circuit through the holes and through the fluid-flow space and can communicate with the working circut through the radially outermost part of the impeller.

2. A fluid coupling according to claim 1, wherein the outer profile diameter of said runner is 10 to 15% less than the outer profile diameter of said impeller.

3. A fluid coupling according to claim 1, wherein the centres of said holes of said first and second sets of holes are spaced from said coupling axis by a distance which is in the range of 58% to 70% of the outer profile radius of said runner.

4. A fluid coupling according to claim 1, wherein the region between each adjacent pair of said angularly spaced vanes of said runner is an intervane pocket, said holes of said first and second sets each being provided in a respective said intervane pocket, said intervane pockets having said holes of said first set alternating with said intervane pockets having said holes of said second set.

5. A fluid coupling according to claim 4, wherein some of said intervane pockets of said runner, viewed in section planes which contain said coupling axis, have shapes which differ from the shapes of other said intervane pockets of said runner, and wherein said runner has core guide means on said vanes thereof and intervane passages in the region between said core guide means and said dished shell of said runner, some of said intervane passages, viewed in said section planes, having shapes which differ from the shapes of other said intervane passages.

6. A fluid coupling according to claim 2, wherein said runner has core guide means therein which, when viewed in different planes containing said coupling axis, has different dimensions; wherein the region between each adjacent pair of said angularly spaced vanes of said runner is an intervane pocket; wherein said holes of said first and second sets are each provided in a respective said intervane pocket, said intervane pockets having said holes of said first set alternating with said intervane pockets having said holes of said second set; and wherein said holes of said first and second sets each have a diameter which is in the range of approximately 1% to 1.6% of the outer profile diameter of said runner.

7. A fluid coupling according to claim 1, including a cooler, and wherein said means for collecting liquid from said reservoir casing passes the collected liquid through said cooler and then discharges the collected liquid into said working circuit.

8. A fluid coupling, comprising coaxially supported impeller and runner elements which are independently rotatable about a coupling axis, each said element being in the form of a dished shell having vanes and said elements together defining a working circuit for a working liquid, an impeller casing supported on said impeller element for rotation therewith and extending around said runner element so as to define a fluid-flow space between said impeller casing and the exterior surface of said runner element, a reservoir for holding working liquid at a location outside said working circuit, leak-off means for defining a restricted flow path from said working circuit to said reservoir, and means for controlling the volume of liquid in said reservoir and for collecting surplus liquid from said reservoir and supplying said surplus liquid to said working circuit, wherein the outer profile diameter of said runner element is from 5 to 15% less than the outer profile diameter of said impeller element, the radially outermost part of said shell of said impeller element lies radially beyond said runner element, said runner element has angularly spaced holes through its shell in the region thereof having the greatest axial width, said holes communicating directly with said space, and said radially outermost part of said impeller element communicating through said space with said holes in said runner element so that working fluid which flows from the working circuit through the holes then flows through the space and can communicate with the working circuit through the radially outermost part of the impeller element.

9. A fluid coupling according to claim 8, including a cooler, and wherein said means for collecting liquid from said reservoir casing causes the collected liquid to pass through said cooler and then discharges the collected liquid into said working circuit.

10. A fluid coupling according to claim 8, wherein said holes extend through the shell of the runner element at a location relative to the coupling axis which is spaced radially inwardly a substantial distance from the outermost part of said impeller element.

11. A fluid coupling according to claim 10, wherein the location of said holes in said runner element is spaced from the coupling axis by a distance of no more than 75% of the outer profile diameter of said runner element.

12. A fluid coupling according to claim 11, wherein said runner element has first and second sets of angularly spaced said holes extending through the dish thereof for direct communication with said space, said first and second sets of said holes being radially spaced apart relative to said coupling axis.

13. A fluid coupling according to claim 12, wherein said first set of holes is spaced from the coupling axis by a distance in the range of 53 to 63% of the outer profile radius of said runner element and the second set of holes is spaced from the coupling axis by a distance in the range of 65 to 75% of the outer profile radius of the runner element.

14. A fluid coupling according to claim 8, wherein the region between each adjacent pair of angularly spaced vanes defines a pocket which directly communicates with no more than one of said holes.

15. In a scoop-controlled fluid coupling which includes: an impeller and a runner which are supported coaxially with respect to and for independent rotation about a coupling axis, said impeller and runner each being a dished shell having plural angularly spaced vanes and together defining a working circuit for a working liquid; an impeller casing supported on said impeller for rotation therewith; a reservoir casing rotatable with said impeller for holding a quantity of the working liquid radially outside said working circuit; and means which includes a radially movable scoop having a scooping tip adjustable to different radial positions in said reservoir casing for collecting liquid from a rotating ring of the liquid held in said reservoir casing and for supplying it to said working circuit, from which the working liquid can return to said reservoir casing through a restricted outlet; the improvement comprising means for preventing any significant increase in the torque transmitted during prolonged acceleration of the coupling due to thermal expansion of the working liquid, said means including the outer profile diameter of said runner being from 5 to 15% smaller than the outer profile diameter of said impeller and the radially outermost part of said impeller lying radially beyond said runner, said impeller casing extending around said runner and projecting inwardly so as to radially overlap the exterior side of the runner to define a space therebetween, said space communicating with the radially outermost part of the impeller, said runner having first and second sets of holes provided through said shell thereof for direct communication with said space, the centres of said holes of said first set being spaced from said coupling axis by a distance in the range of 53 to 63% of the outer profile radius of said runner, and the centres of said holes of said second set being spaced from said coupling axis by a distance in the range of 65 to 75% of the outer profile radius of said runner, said holes in said runner communicating with said radially outermost part of said impeller through said space as provided between said impeller casing and said runner.

16. A fluid coupling according to claim 15, wherein each adjacent pair of angularly spaced vanes of said runner define a pocket therebetween, each said pocket being in direct communication with at least one of the holes of only one of said first and second sets.

* * * * *